United States Patent
Ha

(10) Patent No.: US 12,248,163 B2
(45) Date of Patent: Mar. 11, 2025

(54) OPTICAL DEVICE FOR AUGMENTED REALITY HAVING IMPROVED LIGHT TRANSMITTANCE

(71) Applicant: LETINAR CO., LTD, Anyang-si (KR)

(72) Inventor: Jeong Hun Ha, Seoul (KR)

(73) Assignee: LETINAR CO., LTD., Anyang-si (KR)

( * ) Notice: Subject to any disclaimer, the term of this patent is extended or adjusted under 35 U.S.C. 154(b) by 597 days.

(21) Appl. No.: 17/611,567

(22) PCT Filed: May 8, 2020

(86) PCT No.: PCT/KR2020/006095
§ 371 (c)(1),
(2) Date: Nov. 15, 2021

(87) PCT Pub. No.: WO2020/231100
PCT Pub. Date: Nov. 19, 2020

(65) Prior Publication Data
US 2022/0229220 A1     Jul. 21, 2022

(30) Foreign Application Priority Data

May 16, 2019   (KR) .................. 10-2019-0057542

(51) Int. Cl.
*F21V 8/00*     (2006.01)
*G02B 5/26*     (2006.01)
*G02B 27/01*    (2006.01)

(52) U.S. Cl.
CPC ............. *G02B 6/0035* (2013.01); *G02B 5/26* (2013.01); *G02B 27/0172* (2013.01)

(58) Field of Classification Search
None
See application file for complete search history.

(56) References Cited

U.S. PATENT DOCUMENTS

2017/0329139 A1   11/2017   Shearman et al.
2019/0018238 A1   1/2019    Jenson et al.

FOREIGN PATENT DOCUMENTS

| CN | 107490860 A | * 12/2017 | ........... G02B 25/001 |
|---|---|---|---|
| JP | 2016528533 A | 9/2016 | |
| KR | 100136891 B1 | 6/1998 | |
| KR | 100873409 B1 | 12/2008 | |

(Continued)

*Primary Examiner* — Bao-Luan Q Le
*Assistant Examiner* — Danell L Owens
(74) *Attorney, Agent, or Firm* — Rabin & Berdo, P.C.

(57) ABSTRACT

The present invention provides an optical device for augmented reality having improved light transmittance, the optical device including: an image output unit configured to output augmented reality image light corresponding to an image for augmented reality; a reflective unit configured to transfer the augmented reality image light to the pupil of an eye of a user through reflection; and an optical means adapted such that the reflective unit is disposed therein, and configured to transmit at least a portion of real object image light therethrough toward the pupil of the eye of the user; wherein the reflective unit is formed to have a size of 4 mm or less, and is composed of an optical filter that reflects only image light belonging to the wavelength band of a specific color and transmits image light having a wavelength other than the wavelength band of the specific color therethrough.

6 Claims, 5 Drawing Sheets

(56) References Cited

FOREIGN PATENT DOCUMENTS

| KR | 101660519 B1 | 9/2016 |
| KR | 1020160109021 A | 9/2016 |
| KR | 1020180028339 A | 3/2018 |

\* cited by examiner

OPTICAL DEVICE FOR AUGMENTED REALITY HAVING IMPROVED LIGHT TRANSMITTANCE

TECHNICAL FIELD

The present invention relates to an optical device for augmented reality, and more particularly to an optical device for augmented reality that can increase light transmittance for image light from the real world.

BACKGROUND ART

Augmented Reality (AR) refers to technology that superimposes a virtual image, generated by a computer or the like, on a real image of the real world and then provides a resulting image, as is well known.

In order to provide augmented reality, there is required an optical system that allows a virtual image, generated by a device such as a computer, to be superimposed on an image of the real world and a resulting image to be provided. As such an optical system, there is known a technology using an optical means, such as a prism, that reflects or refracts a virtual image by using a head-mounted display (HMD) or a glasses-type device.

However, devices using the conventional optical system have problems in that it is inconvenient for users to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies such as a prism capable of adjusting focal length for a virtual image and technologies for electrically controlling a variable focal lens in response to a change in focal length. However, these technologies also have a problem in that a user needs to perform a separate operation in order to adjust focal length or hardware such as an additional processor and software for controlling focal length are required.

In order to overcome the problems of the conventional technologies, the present applicant has developed an optical device capable of implementing augmented reality by projecting a virtual image onto the retina through the pupil using a reflective unit having a smaller size than a human pupil, as described in patent document 1.

FIG. 1 is a diagram showing an optical device for augmented reality such as that disclosed in patent document 1 below.

Referring to FIG. 1, an image output unit 30 is a means for outputting image light corresponding to an image for augmented reality, and may be implemented as, e.g., a small-sized display device. A reflective unit 20 provides the image for augmented reality to a user by reflecting image light corresponding to an image for augmented reality, output from the image output unit 30, to the pupil of the user.

An optical means 10 is a means for transmitting at least part of the image light output from a real object, therethrough, and may be, e.g., a lens of eyeglasses. The reflective unit 20 is embedded inside the optical means 10. A frame unit 40 is a means for fixing and supporting both the image output unit 30 and the optical means 10.

The reflective unit 20 of FIG. 1 is formed to have a smaller size, i.e., 8 mm or less, than the human pupil. By forming the reflective unit 20 to be smaller than the pupil as described above, the depth of field for light entering the pupil through the reflective unit 20 can be made almost infinite, i.e., considerably deep.

Here, the depth of field refers to a range within which an image for augmented reality is recognized as being in focus. When the depth of field get increased, focal length for an image for augmented reality get increased accordingly. Thus, even if a user changes the focal length for the real world while gazing at the real world, an image for augmented reality is always recognized as being in focus regardless of such a change. This may be considered as a kind of pinhole effect.

Accordingly, the optical device for augmented reality can always provide a clear virtual image for an image for augmented reality even when a user changes the focal length while gazing at a real object in the real world.

Although this technology has the advantages of increasing the depth of field and obtaining a pinhole effect, it is problematic in that light transmittance may be lowered because image light transmitted through the reflective unit 20 in image light entering from the real world is reflected by the reflective unit 20 and, thus, cannot be transferred to the pupil and is also problematic in that it is difficult to increase the size of the reflective unit 20 due to the former problem.

PRIOR DOCUMENT

Korean Patent No. 10-1660519 (published on Sep. 29, 2016)

DISCLOSURE

Technical Problem

The present invention has been conceived to overcome the above-described limitations, and an object of the present invention is to provide an optical device for augmented reality that can increase light transmittance for image light from the real world.

Another object of the present invention is to provide an optical device for augmented reality that can improve optical uniformity by increasing the size of a reflective unit.

Technical Solution

In order to accomplish the above objects, the present invention provides an optical device for augmented reality having improved light transmittance, the optical device including: an image output unit configured to output augmented reality image light corresponding to an image for augmented reality; a reflective unit configured to transfer the augmented reality image light, output from the image output unit, to the pupil of an eye of a user by reflecting the augmented reality image light toward the pupil, thereby providing the image for augmented reality to the user; and an optical means adapted such that the reflective unit is disposed therein, and configured to transmit at least a portion of real object image light, output from a real object, therethrough toward the pupil of the eye of the user; wherein the reflective unit is formed to have a size of 4 mm or less, and is composed of an optical filter that reflects only image light belonging to the wavelength band of a specific color and transmits image light having a wavelength other than the wavelength band of the specific color therethrough.

In this case, the reflective unit may transfer only augmented reality image light belonging to the wavelength band of the specific color, in the augmented reality image light output from the image output unit, to the pupil of the eye of the user by reflecting the former augmented reality image light toward the pupil, and may transfer the image light having a wavelength other than the wavelength band of the specific color, in the real object image light output from the real object and entering the reflective unit, to the pupil of the eye of the user by transmitting the image light toward the pupil.

Furthermore, the optical filter may be composed of any one of a red reflective filter configured to reflect image light belonging to a red wavelength band and transmit image light belonging to another wavelength band therethrough, a green reflective filter configured to reflect image light belonging to a green wavelength band and transmit image light belonging to another wavelength band, and a blue reflective filter configured to reflect image light belonging to a blue wavelength band and transmit image light belonging to another wavelength band, or a combination of two or more thereof.

Furthermore, the augmented reality image light output from the image output unit may be composed of only image light belonging to the wavelength band of the color reflected by the optical filter constituting the reflective unit.

Furthermore, the reflective unit may include a plurality of reflective units.

Furthermore, at least some of the reflective units may be disposed to partially overlap each other along the optical axis of the image light output from the image output unit.

Moreover, each of the plurality of reflective units may be composed of an optical filter that reflects image light belonging to at least any one of a plurality of wavelength bands obtained by dividing the wavelength band of the specific color and transmits rays of image light belonging to wavelength bands other than the at least any one of the plurality of wavelength bands.

Advantageous Effects

According to the present invention, there can be provided the optical device for augmented reality that can increase light transmittance for image light from the real world.

Furthermore, according to the present invention, there can be provided the optical device for augmented reality that can improve optical uniformity by increasing the size of the reflective unit.

BEST MODE

Embodiments of the present invention will be described in detail below with reference to the accompanying drawings.

Figure 1:
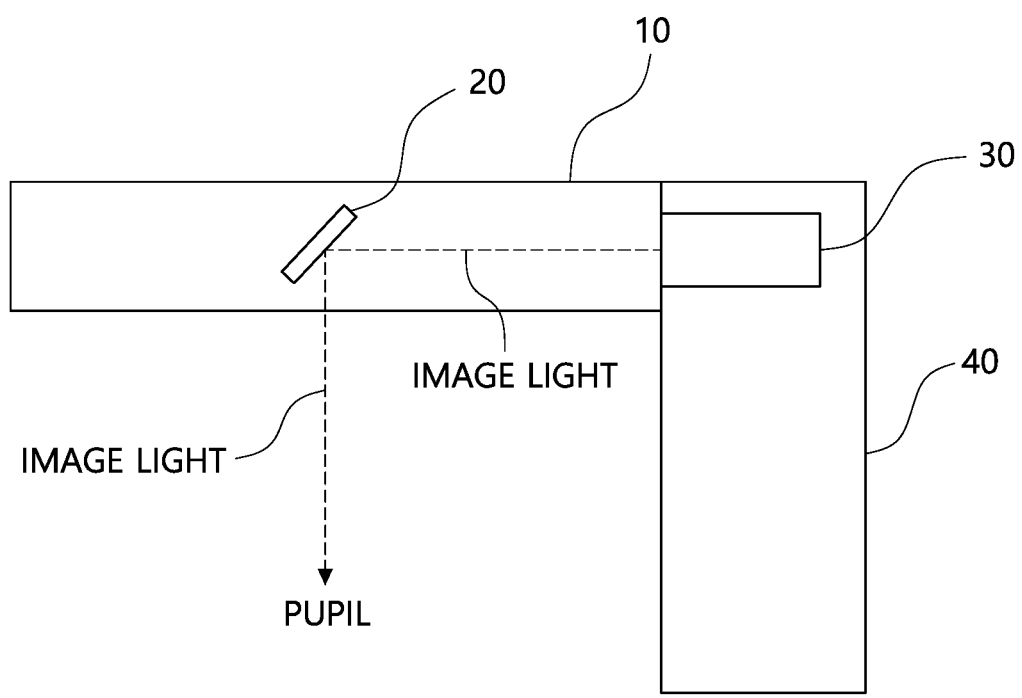
FIG. 1 is a diagram showing an optical device for augmented reality such as that disclosed in prior art document 1.
Figure 2:
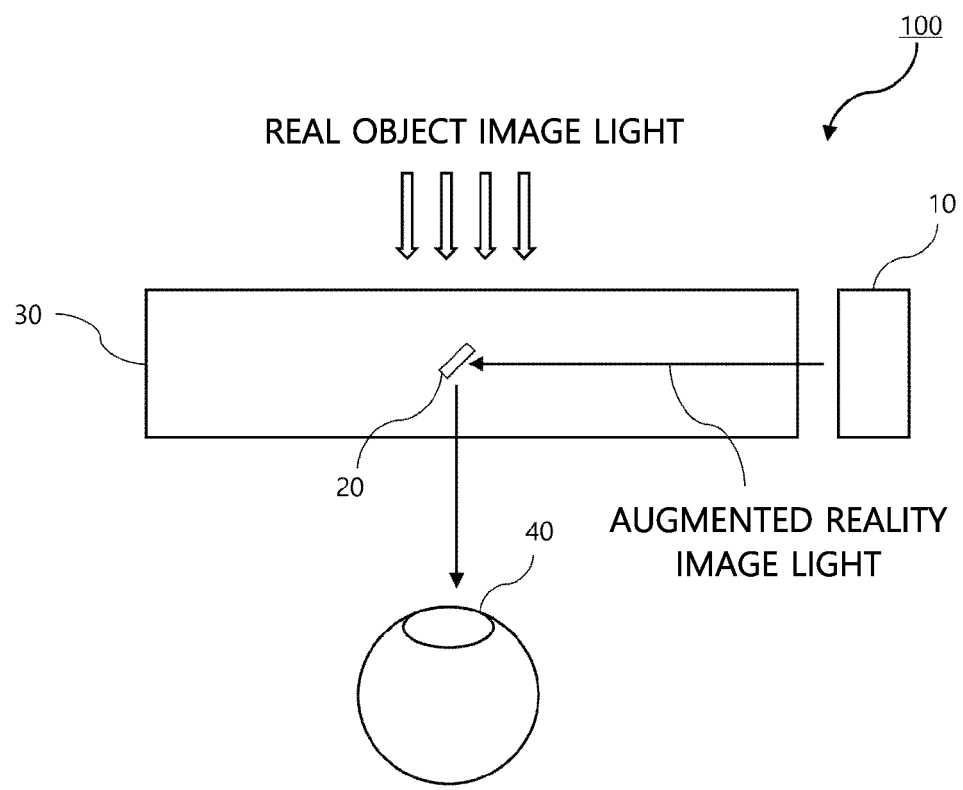
FIG. 2 is a diagram showing the configuration of an embodiment of an optical device (100) for augmented reality having improved light transmittance according to the present invention.

FIG. 2 is a diagram showing the configuration of an embodiment of an optical device 100 for augmented reality having improved light transmittance according to the present invention.

Referring to FIG. 2, the optical device 100 for augmented reality having improved light transmittance (hereinafter simply referred to as the "optical device 100") according to the present embodiment includes an image output unit 10, a reflective unit 20, and an optical means 30.

The image output unit 10 is a means that outputs augmented reality image light corresponding to an image for augmented reality. For example, the image output unit 10 may be a display device such as a small-sized LCD, or may be a reflective, refractive, or diffractive means that outputs image light output from a display device by reflecting, refracting, or diffracting the image light.

In other words, the image output unit 10 refers to a display device itself that displays an image for augmented reality, or refers to other various means such as a reflective, refractive or diffractive means that outputs augmented reality image light output from a display device.

Since the image output unit 10 itself is not a direct target of the present invention and is known in the prior art, a detailed description thereof will be omitted here.

Meanwhile, the image for augmented reality refers to a virtual image that is displayed on a display device and transferred to the pupil 40 of a user through the reflective unit 20 when the display device is the image output unit 10, or refers to a virtual image that is displayed on a display device and transferred to the pupil 40 of a user through the image output unit 10 and the reflective unit 20 when the display device is not the image output unit 10.

The image for augmented reality may be a still image or moving image.

The image for augmented reality is output from the image output unit 10 and transferred to the pupil 40 of the user through the reflective unit 20, so that a virtual image is provided to the user. At the same time, image light output from a real object present in the real world is transferred to the user through the optical means 30. As a result, the virtual image is provided while being superimposed on the real object, so that the user is provided with an augmented reality service.

Meanwhile, although the image output unit 10 is disposed in a direction perpendicular to the pupil 40 with respect to the reflective unit 20 and shown as being disposed on a side when the user gazes at the front, this is exemplary. When the user gazes at the front, the image output unit 10 may be disposed on an upper side, a lower side, or the like, or may be disposed at a different angle.

The reflective unit 20 is a means that transfers augmented reality image light corresponding to an image for augmented reality, output from the image output unit 10, to the pupil 40 of an eye of the user by reflecting the augmented reality image light toward the pupil 40, thereby providing the image for augmented reality to the user.

It is preferable that the reflective unit 20 is spaced apart from the surface of the optical means 30 and completely embedded and disposed inside the optical means 30. However, in some cases, the reflective unit 20 may be disposed on the surface (the surface facing the pupil 40 of the user) of the optical means 30.

The reflective unit 20 is disposed at an appropriate angle between the image output unit 10 and the pupil 40 in order to reflect augmented reality image light toward the pupil 40. For example, when the image output unit 10 is disposed on the right side of the optical means 30 as shown in FIG. 2, the reflective unit 20 may be disposed such that the center of the optical axis of augmented reality image light output from the image output unit 10 has an angle of 45 degrees with respect to a forward direction from the pupil 40.

Meanwhile, it is preferable that the reflective unit 20 is formed to have a size smaller than the size of the human pupil, i.e., 8 mm or less, more preferably 4 mm or less, in order to obtain a pinhole effect by increasing the depth of field, as described in the background art section.

In other words, the reflective unit 20 is formed to have a size smaller than the size of the common human pupil, so that the depth of field for light entering the pupil 40 through the reflective unit 20 can be made almost infinite, i.e., considerably deep. Accordingly, there can be generated a pinhole effect that allows an image for augmented reality to be always recognized as being in focus regardless of a change in focal length even when the user changes the focal length for the real world while gazing at the real world.

Meanwhile, when the size of the reflective unit 20 is excessively small, a diffraction phenomenon may occur, so that it is preferable to allow the size of the reflective unit 20 to be larger than about 700 µm.

Meanwhile, the present invention is characterized in that the reflective unit 20 is composed of an optical filter that reflects only image light belonging to the wavelength band of a specific color and transmits image light having a wavelength other than the wavelength band of the specific color.

In other words, the reflective unit 20 of the present invention transfers only the image light belonging to the wavelength band of the specific color in the augmented reality image light output from the image output unit 10 by reflecting the image light toward the pupil 40 of the eye of the user, and transmits image light having a wavelength other than the wavelength band of the specific color, in the augmented reality image light output from the image output unit 10, therethrough.

Furthermore, the reflective unit 20 transfers image light having a wavelength other than the wavelength band of the specific color, in real object image light output from a real object and entering the reflective unit 20, to the pupil 40 of the eye of the user by transmitting the image light therethrough toward the pupil 40, and reflects image light belonging to the wavelength band of the specific color in the real object image light output from the real object and entering the reflective unit 20.

In other words, the reflective unit 20 is composed of an optical filter that transfers image light belonging to the wavelength band of the specific color, in the augmented reality image light output from the image output unit 10, to the pupil 40 of the eye of the user by reflecting the image light toward the pupil 40 and transfers image light having a wavelength other than the wavelength band of the specific color, in the real object image light output from the real object and entering the reflective unit 20, to the pupil 40 of the eye of the user by transmitting the latter image light therethrough.

In this case, the optical filter may be an optical filter that reflects only image light belonging to at least one of red, green, and blue wavelength bands.

In other words, the optical filter may be composed of any one of a red reflective filter configured to reflect image light belonging to a red wavelength band and transmit image light belonging to another wavelength band therethrough, a green reflective filter configured to reflect image light belonging to a green wavelength band and transmit image light belonging to another wavelength band, and a blue reflective filter configured to reflect image light belonging to a blue wavelength band and transmit image light belonging to another wavelength band, or may be composed of a combination of two or more thereof.

An optical filter known in the prior art may be used as the optical filter. Since the optical filter is not a direct target of the present invention, a detailed description thereof will be omitted here.

Figure 3:
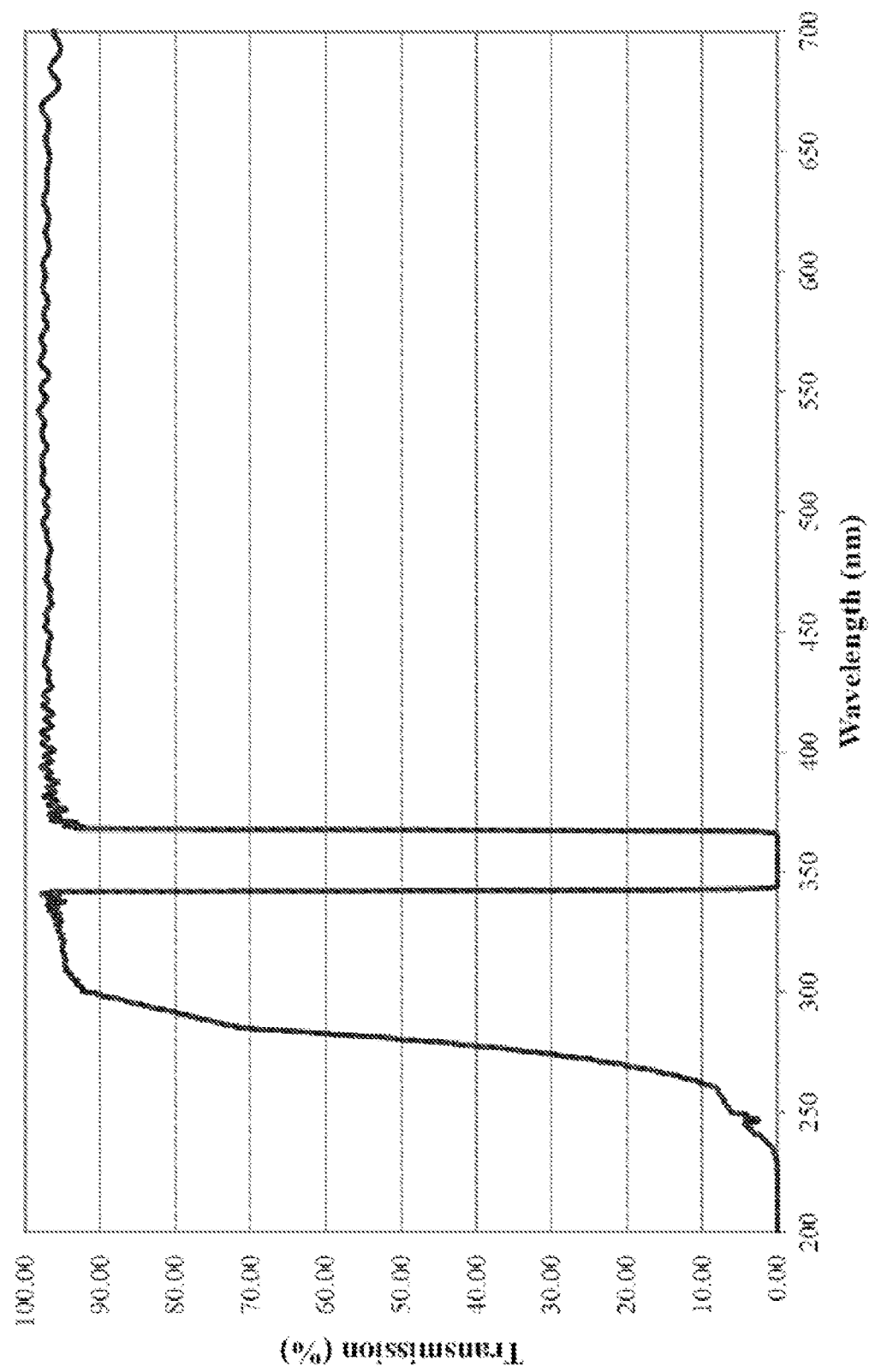
FIG. 3 is a graph showing the reflectance/transmittance of a blue reflective filter according to wavelength.

FIG. 3 is a graph showing the reflectance/transmittance of a blue reflective filter according to wavelength.

In FIG. 3, the horizontal axis represents wavelength λ (nm), and the vertical axis represents transmittance according to wavelength.

As shown in FIG. 3, it can be seen that the blue reflective filter reflects image light having a wavelength of about 350 nm to about 370 nm belonging to a blue wavelength band and transmits image light belonging to another wavelength band therethrough.

As described above, the reflective unit 20 may be composed of an optical filter that reflects image light belonging to the wavelength band of a specific color and transmits image light belonging to the wavelength band of another color therethrough.

Referring back to FIG. 2, the optical means 30 is a means in which the reflective unit 20 is embedded and which transmits at least a portion of the real object image light, output from the real object, therethrough toward the pupil 40 of the eye of the user.

Although the reflective unit 20 is embedded and disposed in the inner surface of the optical means 30, it may also be disposed on the surface of the optical means 30.

The optical means 30 may be made of a material such as glass or transparent plastic. The optical means 30 is disposed in front of the pupil 40 of the user during use and transmits real object image light, output from a real object present in the real world, therethrough to the pupil 40. The optical means 30 may be implemented using a translucent material, in which case the optical means 30 transmits a portion of image light, output from a real object, therethrough toward the pupil 40.

The optical means 30 may be coupled to the surface of the lens of a glasses-type augmented reality provision device (not shown), composed of lenses and a frame, in a modular form. Alternatively, the lens itself of the augmented reality provision device may be configured as the optical means 30.

Meanwhile, although image light corresponding to an image for augmented reality output from the image output unit 10 may be transferred directly to the reflective unit 20, it may be transferred after being reflected at least once from the inner surface of the optical means 30.

Figure 4:
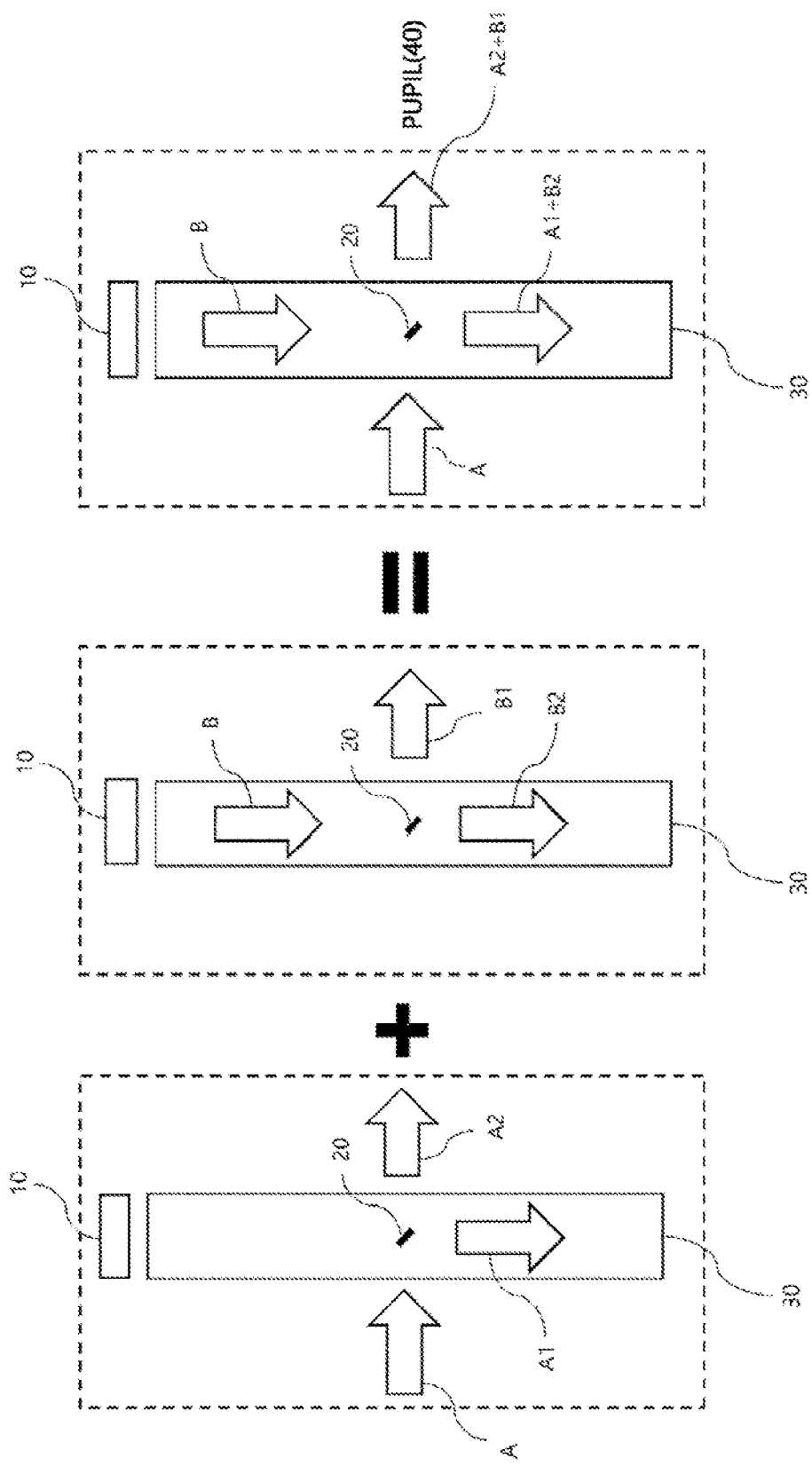
FIG. 4 is a view illustrating the operation of a reflective unit (20) composed of an optical filter according to the present invention.

FIG. 4 is a view illustrating the operation of the reflective unit 20 composed of an optical filter according to the present invention.

In FIG. 4, as described above, the reflective unit 20 is composed of a red, green and blue reflective filter that is a combination of a red reflective filter, a green reflective filter, and a blue reflective filter and has the property of reflecting image light belonging to red, green, and blue wavelength bands and transmitting light having a wavelength other than the red, green, and blue wavelength bands therethrough.

Referring to the left drawing of FIG. 4, it can be seen that image light A1 belonging to red, green, and blue wavelength bands in real object image light A output from a real object and entering the reflective unit 20 is reflected downward by the reflective unit 20 composed of the red, green and blue reflective filter and real object image light A2 belonging to the wavelength bands of colors other than red, green, and blue is transmitted through the reflective unit 20 and transferred to the pupil 40.

In other words, only the image light A2 belonging to the remaining wavelength bands excluding the image light A1 belonging to the red, green, and blue wavelength bands in the real object image light A output from the real object and entering the reflective unit 20 is transferred to the pupil 40.

Furthermore, referring to the intermediate drawing of FIG. 4, it can be seen that image light B1 belonging to the red, green, and blue wavelength bands in augmented reality image light B output from the image output unit 10 and entering the reflective unit 20 is reflected by the reflective unit 20 composed of the red, green and blue reflective filter and is then transferred to the pupil 40 and image light B2 belonging to the wavelength bands of colors other than red, green, and blue is transmitted through the reflective unit 20 and is then moved in a downward direction. In other words, in the augmented reality image light B output from the image output unit 10 and transferred to the reflective unit 20, only the image light B1 belonging to the red, green, and blue wavelength bands is transferred to the pupil 40.

FIG. 4 shows the real object image light A output from the real object and entering the reflective unit 20, the augmented reality image light B output from the image output unit 10, and image light A2+B1 entering the pupil 40 in combination. As shown in this drawing, it can be seen that the augmented reality image light B1 belonging to the red, green, and blue wavelength bands output from the image output unit 10 and the real object image light A2 belonging to wavelength bands other than the red, green, and blue wavelength bands output from the real object and transmitted through the reflective unit 20 reach the pupil 40.

Meanwhile, the wavelength band of augmented reality image light output from the image output unit 10 may be adjusted in accordance with the property of the optical filter constituting the reflective unit 20. In other words, a configuration may be made such that only augmented reality image light belonging to the wavelength band of a color reflected by the optical filter constituting the reflective unit 20 may be output from the image output unit 10.

For example, when the optical filter is a red, green and blue reflective filter as shown in FIG. 4, rays of augmented reality image light output from the image output unit 10 may be composed of only rays of image light belonging to red, green, and blue wavelength bands.

Figure 5:
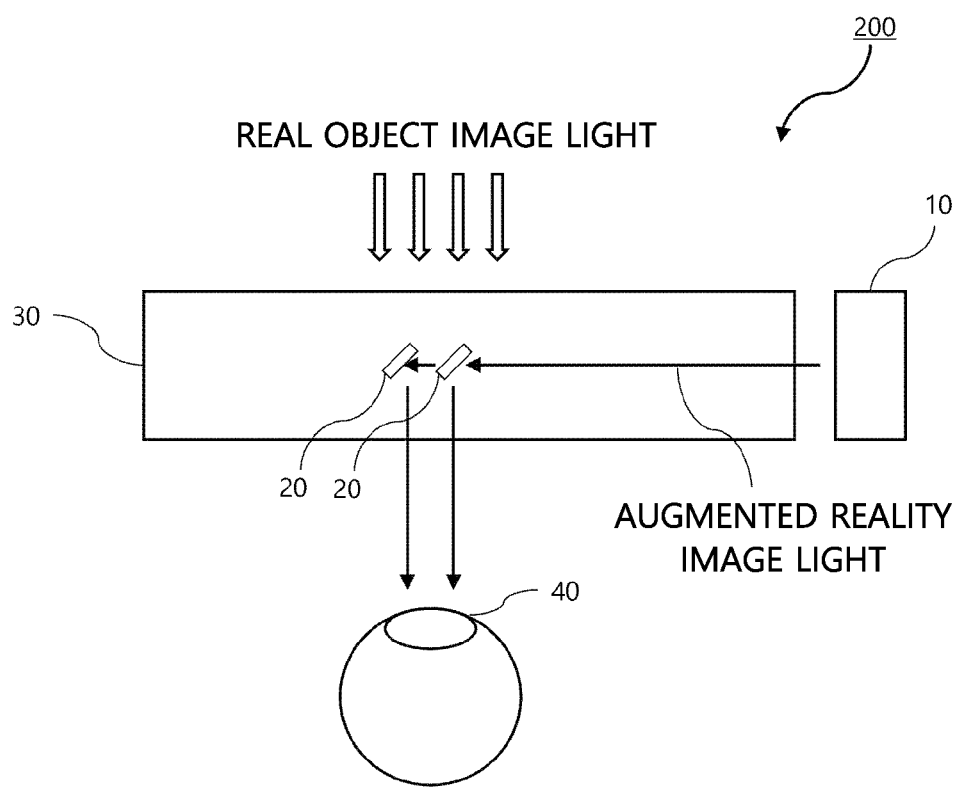
FIG. 5 is a diagram showing an optical device (200) according to another embodiment of the present invention.

FIG. 5 is a diagram showing an optical device 200 according to another embodiment of the present invention.

The embodiment of FIG. 5 is basically the same as the embodiment of FIGS. 2 to 4 except that a reflective unit is implemented as a plurality of reflective units 20.

Referring to FIG. 5, the plurality of reflective units 20 may be disposed to partially overlap each other when viewed in the optical axis direction of augmented reality image light output from the image output unit 10 so that at least a portion of the augmented reality image light output from the image output unit 10 can be blocked.

For example, in FIG. 5, the reflective units 20 is disposed alongside each other in the optical axis direction of image light output from the image output unit 10, and the reflective units 20 disposed alongside each other overlap each other when viewed from the optical axis direction of the image light output from the image output unit 10. Accordingly, in FIG. 5, for the left reflective unit 20, at least a portion of image light output from the image output unit 10 is blocked by the right reflective unit 20.

In this case, each of the reflective units 20 disposed alongside each other may be composed of an optical filter that reflects image light belonging to at least any one of a plurality of wavelength bands obtained by dividing the wavelength band of a specific color and transmits rays of image light belonging to wavelength bands other than the at least any one of the plurality of wavelength bands therethrough.

For example, each of the reflective units 20 may be composed of an optical filter that, when a blue wavelength band ranges from 350 nm to 370 nm and is divided into a wavelength band from 350 nm to 360 nm and a wavelength band from 360 nm to 370 nm, reflects only image light belonging to each of the plurality of divided wavelength bands.

In other words, in FIG. 5, the right reflective unit 20 may be composed of an optical filter that reflects image light having a wavelength of 350 nm to 360 nm and transmits image light belonging to other wavelength bands therethrough, and the left reflective unit 20 may be composed of an optical filter that reflects image light having a wavelength of 360 nm to 370 nm and transmits image light belonging to other wavelength bands therethrough According to this disposition structure, the image light having a wavelength of 360 nm to 370 nm may be transmitted through the right reflective unit 20, may reach the left reflective unit 20, and may be transferred to the pupil 40 by the left reflective unit 20. Furthermore, the image light having a wavelength of 350 nm to 360 nm may be reflected by the right reflective unit 20, and may be transferred to the pupil 40. Accordingly, a specific color recognized by a human as the same color may be divided into a plurality of wavelength bands, and then each of the reflective units 20 may independently reflect image light belonging to a corresponding one of the divided wavelength bands.

Meanwhile, although the reflective units 20 are disposed alongside each other in the optical axis direction of image light output from the image output unit 10 and are shown as completely overlapping each other in the embodiment of FIG. 5, this is an example. It is obvious that the reflective units 20 may be disposed to partially overlap each other in the optical axis direction.

Meanwhile, the plurality of reflective units 20 may be disposed not to overlap each other when viewed in the optical axis direction of augmented reality image light output from the image output unit 10 so that the image light output from the image output unit 10 is not blocked.

While the present invention has been described with reference to the preferred embodiments of the present invention, it is obvious that the present invention is not limited to the embodiments and it should be noted that other various modifications and alterations may be possible within the scope of the present invention.

For example, although the optical filter that reflects image light having a wavelength in the wavelength bands of red, green, and blue has been chiefly described in the above embodiment, it is obvious that an optical filter that reflects image light having a wavelength in wavelength bands other than the wavelength bands of these colors may be used as the reflective unit 20.

The invention claimed is:

1. An optical device for augmented reality having improved light transmittance, the optical device comprising:
an image output unit configured to output augmented reality image light corresponding to an image for augmented reality;

a reflective unit configured to transfer the augmented reality image light, output from the image output unit, to a pupil of an eye of a user by reflecting the augmented reality image light toward the pupil, thereby providing the image for augmented reality to the user; and an optical means adapted such that the reflective unit is disposed therein, and configured to transmit at least a portion of real object image light, output from a real object, therethrough toward the pupil of the eye of the user;

wherein the reflective unit is formed to have a size of 4 mm or less, and is composed of an optical filter that reflects only image light belonging to a wavelength band of a specific color and transmits image light having a wavelength other than the wavelength band of the specific color therethrough, and wherein the reflective unit transfers only augmented reality image light belonging to the wavelength band of the specific color, in the augmented reality image light output from the image output unit, to the pupil of the eye of the user by reflecting the augmented reality image light toward the pupil, and transfers the image light having a wavelength other than the wavelength band of the specific color, in the real object image light output from the real object and entering the reflective unit, to the pupil of the eye of the user by transmitting the image light toward the pupil.

2. The optical device of claim 1, wherein the optical filter is composed of any one of a red reflective filter configured to reflect image light belonging to a red wavelength band and transmit image light belonging to another wavelength band therethrough, a green reflective filter configured to reflect image light belonging to a green wavelength band and transmit image light belonging to another wavelength band, and a blue reflective filter configured to reflect image light belonging to a blue wavelength band and transmit image light belonging to another wavelength band, or a combination of two or more thereof.

3. The optical device of claim 1, wherein the augmented reality image light output from the image output unit is composed of only image light belonging to the wavelength band of the color reflected by the optical filter constituting the reflective unit.

4. The optical device of claim 1, wherein the reflective unit comprises a plurality of reflective units.

5. The optical device of claim 4, wherein at least some of the reflective units are disposed to partially overlap each other along an optical axis of the image light output from the image output unit.

6. The optical device of claim 5, wherein each of the plurality of reflective units is composed of an optical filter that reflects image light belonging to at least any one of a plurality of wavelength bands obtained by dividing the wavelength band of the specific color and transmits rays of image light belonging to wavelength bands other than the at least any one of the plurality of wavelength bands.

* * * * *